Aug. 15, 1972

3,684,680

ELECTRODES FOR ELECTROLYTIC OR CATHODIC
ANTICORROSION PROTECTION

Filed Jan. 6, 1971

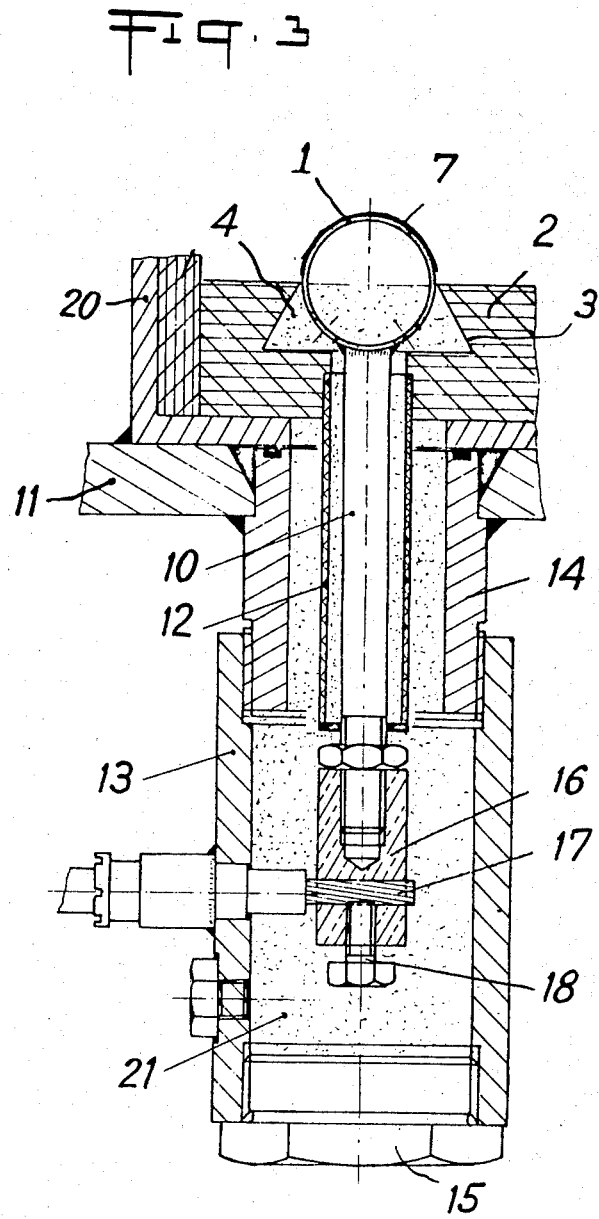

United States Patent Office 3,684,680
Patented Aug. 15, 1972

3,684,680
ELECTRODES FOR ELECTROLYTIC OR CATHODIC ANTICORROSION PROTECTION
Bernard Marie Louis Heuze, Boulogne, France, assignor to Societe d'Etudes Contre la Corrosion (SECCO), Paris, France
Filed Jan. 8, 1971, Ser. No. 104,974
Int. Cl. C23f 13/00
U.S. Cl. 204—196
6 Claims

ABSTRACT OF THE DISCLOSURE

This invention relates to electrodes for use in cathodic or electrolytic anticorrosion protection, particularly for protecting objects sited in sea water, of the kind comprising one or more tubes made of a suitable metal, such as titanium or tantalum, covered by an active layer of another suitable metal, such as platinum or rhodium. According to the invention, this tube or tubes is/are perforated and housed in a groove of a base member of insulating material, the interengagement being effected by means of an electrically insulating sealing material which penetrates through the perforations in the tube or tubes. Advantageously, the active layer covers only part of the tube. The groove is preferably of such shape as to provide a positive interlock, e.g. it is of dovetail section and, to enhance the anchoring effect, one or more wires passing through opposed perforations in the tube is/are embedded in the sealing material outside the tube.

---

The present invention relates to electordes used for electrolytic or cathodic anticorrosion protection, and more particularly those which are intended for the protection of members immersed in a marine medium, such as the ocean.

Known electrodes for this purpose are primarily formed from a support or subjectile made of metal, such as titanium or tantalum, which can withstand a positive difference of potential of several volts with respect to the medium wherein it is located without suffering corrosion, and covered by a thin layer, usually 2 to 5µ, of a much more precious metal such as platinum or rhodium. Electrodes of this kind have the great advantage of having a life of several years and of then being able to be recovered to receive a new coating; however, presuming, of course, that they have not been damaged during use.

At the present time, electrodes of this type exist in two forms. In one form, usually used for protecting ships, they are in the form of plates embedded in electrically insulating bases, said bases themselves being surrounded by a frame used for their attachment to the side of the ship by means of screws or welding; electrodes of this type which are rigidly fixed parallel to the side give complete satisfaction through their use. However, for different reasons, more particularly price optimisation, thin plates are used, consequently they have only a small electrical conductance and a high resistance which can be remedied by positioning a duplicating electrical conductor which forms an electrical shunt thereto. The production of this electric shunt as well as the difficulty of sealing the plates in secure manner in their insulating base, form major drawbacks inherent to electrodes in plate form.

In another form, they comprise rods or cylindrical tubes, assembly of which is achieved by impacting one of their ends in an insulating member; numerous drawbacks are associated therewith, one of which is that they are vulnerable and easily damaged by floating objects. For these reasons, they are not very well suited to the protection of floating craft, such as ships, or fixed objects, such as pontoons, landing stages and jetties.

The invention has for an object an electrode formed by a support made of metal such as tantalum or titanium, covered by a thin layer of another metal such as platinum or rhodium, embedded in an electrically insulating base which is easy to produce, easy to locate and to connect to the current generator, which does not require the use of a shunt owing to its small electrical resistance, and which is robust and, consequently, is reasonably safe from damage by floating objects. Such an electrode is of particular use in the protection of ships, pontoons, landing stages, docks and other floating craft.

The support (which is made of a metal such as titanium or tantalum, extremely resistant to corrosion), for the active layer (which is made of a more precious metal), will hereinafter be referred to as a "subjectile."

For fulfilling this and other objects, the invention consists in an electrode for use in cathodic or electrolytic anticorrosion protection, more particularly for protecting marine craft, and comprising one or more tubes of suitable metal covered by an active layer of another suitable metal, wherein the tube or tubes is/are preforated and housed in a groove of a base made of an insulating material by means of an electrically insulating sealing material which penetrates through said perforations of said metal tube or tubes.

According to another feature, a metal reinforcement may pass through the perforations so as to anchor the subjectile in the sealing material. The active layer may cover only part of the metal tube or tubes.

The electrode may be associated with a protection device which prevents the active layer from deteriorating during transport and positioning thereof.

In order that the invention may be more clearly understood, reference will now be made to the accompanying drawings which show certain embodiments thereof by way of example, and in which:

FIG. 3 shows an arrangement for connecting an electrode according to the invention to an object to be protected.

Figure 1:
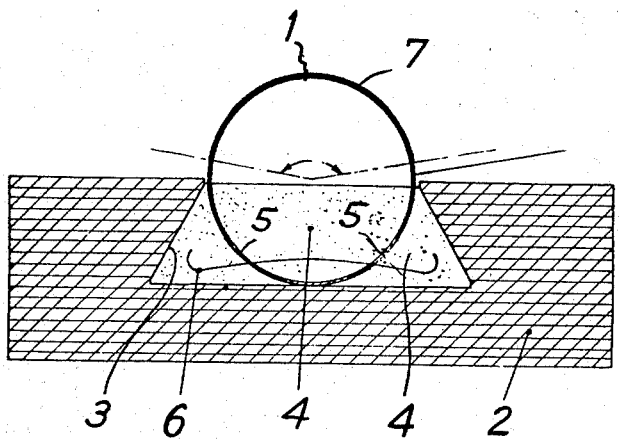
FIG. 1 shows a cross-section through an electrode according to the invention.

Referring now to the drawings, there is shown an electrode which comprises a tube 1 made of titanium which forms the subjectile; it may have a diameter of approximately 50 mm. and a thickness of the order of 1 mm. This tube 1 is secured to a support member or base 2 of electrically insulating material which, for example, may be a non-plastified polyvinylchloride, or a laminate having an epoxy resin base. The base 2 has formed therein a longitudinal groove 3 whose cross-section is of dove-tail shape, and the subjectile is sealed therein by means of a material 4 hereinafter referred to as a sealing material.

The material 4 is such that after having been in a liquid state or at least sufficiently fluid to enable positioning of the electrode, it then hardens, for example, by cooling or polymerising. Preferably, the subjectile 1 comprises, as shown in this embodiment, perforations 5 evenly distributed over part of its wall surface; these perforations are 50 mm. apart and have a diameter of the order of 10 mm. The sealing material 4 in its fluid state completely fills the groove 3 and penetrates into the subjectile; when it hardens, it is locked in the groove 3 and the subjectile is thus rigidly anchored therein. In order to assist this anchoring action, wires 6 of tantalum or titanium may be passed from one side to the other through opposite perforations 5 that are located substantially in the same cross-sectional plane. The wires may have a diameter of 1 or 2 mm., for example.

An active layer 7 of platinum or rhodium having a thickness of the order of $2.5\mu$ is arranged on that part of the wall of the subjectile not covered by the base; this part of the subjectile covered by the active layer may extend for example over an arc of 160°.

It will be apparent from the drawings that the sealing of the electrode in its base is easy to effect and that it and the sealing material are firmly locked together, due to the dove-tailed section of the groove and the additional anchoring of the subjectile in this material due to the reinforcing wires passing through the perforations 5. Moreover, the resistance of the subjectile is not high and it is not necessary to form an electrical shunt during assembly of the electrode, even if it has to be several metres long, as is often the case. Such an electrode, 2 metres long, and receiving a current of 100 amps, can operate for about ten years in sea water.

Figure 2:
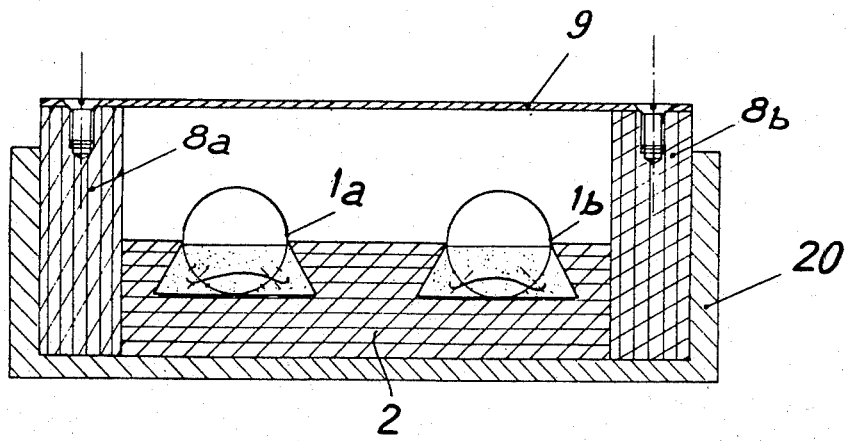
FIG. 2 shows a section through two associated electrodes arranged in a protection device.

FIG. 2 shows how a pair of electrodes of the kind shown in FIG. 1, can be grouped together to reduce the length of the device by increasing its width; although a pair of electrodes is shown in FIG. 2, it will be apparent that any desired number may be associated side by side.

In the arrangement of FIG. 2, a base 2 is used which is provided with two parallel grooves in which two subjectiles 1a and 1b are housed, each covered by an active layer. The base 2 is placed in a metal casing 20 having the shape of a U in cross-section which imparts very great rigidity thereto. Between the edges of the base 2 and the sides of the casing 20, are located flanges 8a and 8b which, like the base, are made of an electrically insulating material; the presence of these two insulating flanges 8a and 8b avoids any short circuit between the electrodes and the metal casing when the electrodes are in place in an electrically-conductive medium. A metal plate 9 is fixed by screws to the flanges 8a and 8b, said plate 9 being electrically insulated from the casing 20 and the subjectiles 1a and 1b.

Thus, the electrode assembly is entirely protected and it may easily be handled, transported and positioned without any danger of deterioration, more particularly of the conductive layer made of platinum or rhodium which, by reason of its thinness, is particularly vulnerable.

In this respect, it must be noted that the plate 9 is attached without any sealing means and that the two ends of the casing 20 are not sealed. Therefore, when the assembly is in place, the electrolytic medium in which it is positioned (sea water in this embodiment) passes into the casing and fills all the free space. The electrodes can then be used without having to withdraw the plate 9; the action of electric current emitted by the electrodes causes rapid electrolysis and this dissolution of the plate. The mechanical protection of the electrodes being ensured under these conditions, there is practically no danger of deterioration between the time when they are assembly in the workshop and their putting into use. Electrodes according to the invention may easily be assembled. In fact, it is sufficient, for example, to machine the base 2 so as to form the groove or grooves 3, then to partially fill this groove or grooves with the sealing material in the fluid state, to locate the subjectile or subjectiles therein, and to keep it or them in position until the said material had hardened.

The electrical connections for such electrodes can also be produced easily. The electrode as made up in the workshop, usually comprises a certain length of conductive cable which, during positionining of the electrode on the object to be protected, is connected to a cable issuing from the generator. To connect the cable to the subjectile, the cable is welded to a peg which can be inserted by force into the subejctile. The connection can also be made by means of a special member or eyelet set on the end of the cable which has previously been bared. In this case, an intermediate member is positioned between the eyelet and the subjectile made of a material which conducts electricity, one side of which is flat and the other side of which is cylindrical, a screw and a nut firmly applying the assembly formed by the eyelet and intermediate member against the projectile. In the two preceding cases, the connection is positioned before the subjectile is housed in the groove of the base. Thus, the sealing material positively surrounds the connection and the insulant.

In the method of connection shown in FIG. 3, a rod 10 is welded to the subjectile; it passes through the base 2, the metal casing 20 which holds the base 2, and the metal wall 11 to which the electrode is to be fixed. A tube 12 of insulating material surrounds the rod 10 and an outer sheath comprising two parts 13 and 14 closed by a cap 15, protects the unit. The tube 12 is of a diameter between that of the rod 10 and that of the sheath part 13 so that insulating material 21 can be cast to ensure perfect sealing of the connection.

The actual connection is made by a block 16 screwed to the rod 10 and which has a channel wherein a cable 17 is engaged; a screw 18 secures the cable in relation to the block.

I claim:

1. In an anode assembly for use in a cathodic anti-corrosion protection system for underwater metal structures comprising a support member of electrically insulating material and at least one tube made of a metal selected from the group titanium and tantalum covered by an active layer of metal selected from the group platinum and rhodium, said at least one tube being embedded in said support member, the improvement which consists in that said at least one metal tube is perforated and housed in a groove in said support member, by means of an electrically insulating material which fills said groove and penetrates through said perforations of said metal tube to lock said metal tube to said support member.

2. An anode assembly according to claim 1, wherein said active layer covers only part of said at least one metal tube.

3. An anode assembly according to claim 1, wherein said groove has a dove-tail shaped cross-section, the broadest part being underneath said metal tube.

4. An anode assembly to claim 1, wherein at least one wire passes through two opposed perforations of said metal tube and is embedded in said sealing material.

5. An anode assembly according to claim 1, wherein said support member is arranged in a metal casing having a U-shaped cross-section, insulating flanges higher than the sides of said casing are positioned between said sides and said base, and a metal plate is secured to said insulating flanges to interconnect them.

6. An anode assembly according to claim 5, wherein a rod of electrically conducting material is secured to said metal tube and passes through said insulating base and said metal casing, said rod being surrounded by an outer sheath closed by a cap and by an insulating tube of diameter between that of said outer sheath and said rod, thus leaving an intervening space between said sheath and said rod, and an insulating material filling said intervening space, said rod having a connecting means at its end remote from said metal tube, for connection of a cable.

References Cited
UNITED STATES PATENTS

| | | | |
|---|---|---|---|
| 3,022,242 | 2/1962 | Anderson | 204—290 F |
| 3,022,243 | 2/1962 | Anderson | 204—196 |
| 3,038,849 | 6/1962 | Preiser | 204—196 |
| 3,067,122 | 12/1962 | Sabins | 204—196 |
| 3,133,872 | 5/1964 | Miller et al. | 204—290 F |
| 3,342,716 | 9/1967 | Anderson et al. | 204—196 |
| 3,408,280 | 10/1968 | Preiser | 204—196 |
| 3,409,530 | 11/1968 | Locke et al. | 204—196 |
| 3,488,274 | 1/1970 | Geld | 204—196 |
| 3,497,443 | 2/1970 | von Burgsdorff | 204—196 |

TA HSUNG TUNG, Primary Examiner

U.S. Cl. X.R.

204—286, 290 F, 297 R